United States Patent
Simon et al.

(10) Patent No.: US 9,558,467 B1
(45) Date of Patent: Jan. 31, 2017

(54) SYSTEMS AND/OR METHODS FOR GRID-BASED MULTI-LEVEL DIGITIZATION OF ENTERPRISE MODELS

(71) Applicant: Software AG, Darmstadt (DE)

(72) Inventors: Katrina Simon, St. Ingbert (DE); Thomas Winkler, Leipzig (DE); Abhinandan Ganapati Banne, Belgaum (IN); Viktor Tymoshenko, Leipzig (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 15/058,253

(22) Filed: Mar. 2, 2016

(51) Int. Cl.
*G06Q 10/06* (2012.01)
(52) U.S. Cl.
CPC .................. *G06Q 10/067* (2013.01)
(58) Field of Classification Search
CPC .. G06Q 10/06; G06Q 10/067; G06Q 10/0633; G06F 8/10; G06F 8/35; G06T 17/00; G06T 15/02
See application file for complete search history.

(56) References Cited

U.S. PATENT DOCUMENTS

| | | | |
|---|---|---|---|
| 4,491,960 A | 1/1985 | Brown | |
| 5,251,268 A | 10/1993 | Colley et al. | |
| 5,337,372 A | 8/1994 | LeCun et al. | |
| 5,729,630 A | 3/1998 | Ikeda | |
| 6,320,597 B1 | 11/2001 | Ieperen | |
| 7,171,056 B2 | 1/2007 | Zhang et al. | |

OTHER PUBLICATIONS

Prabhu et al, "Whiteboard documentation through foreground object detection and stroke classification", Oct. 2008, IEEE, pp. 336-340.*
Wikipedia—OpenCV, retrieved Mar. 1, 2016, 4 pages. https://en.wikipedia.org/wiki/OpenCV.
OpenCV, retrieved Mar. 1, 2016, 1 page. http://opencv.org/.
Wikipedia—Tesseract (software), retrieved Mar. 1, 2016, 4 pages. https://en.wikipedia.org/wiki/Tesseract_%28software%29.
Post-it Plus App, retrieved Mar. 1, 2016, 6 pages. http://www.post-it.com/3M/en_US/post-it/ideas/plus-app/?WT.mc_id=www.post-it.com/app.
Simbio: Product-Portfolio, retrieved Mar. 2, 2016, 4 pages. http://www.symbioworld.com/en/product/product-portfolio.html.

* cited by examiner

*Primary Examiner* — Edward Park
(74) *Attorney, Agent, or Firm* — Nixon & Vanderhye PC

(57) ABSTRACT

Certain example embodiments relate to techniques for creating/updating a computerized model usable with an enterprise modeling platform. The computerized model is defined with a first modeling language. An image of a hand-drawn model existing on a physical substrate and following rules of a second modeling language is acquired. Multi-level image processing is performed on the image, the different levels corresponding to recognitions of (a) structures in the image corresponding to objects in the hand-drawn model, (b) object types for the identified structures, (c) text associated with the identified structures, and (d) connections between at least some of the identified structures. A digitized, iteratively-reviewed version of the hand-drawn model is generated and transformed into the computerized model using rules defining relationships between elements in the different modeling languages. Generation includes presenting, on a level-by-level basis, results of the recognitions; and accepting user modification(s) to the results on that basis.

26 Claims, 13 Drawing Sheets
(9 of 13 Drawing Sheet(s) Filed in Color)

SYSTEMS AND/OR METHODS FOR GRID-BASED MULTI-LEVEL DIGITIZATION OF ENTERPRISE MODELS

TECHNICAL FIELD

Certain example embodiments described herein relate to techniques for generating enterprise models. More particularly, certain example embodiments described herein relate to systems and/or methods that take a grid-based, multi-level, and user-interactive approach to transforming content created on a whiteboard or the like into a computerized enterprise model usable with an enterprise modeling system.

BACKGROUND AND SUMMARY

Enterprise modeling typically involves the building of a graphical diagram that describes and defines structures, processes, information, and/or resources of an organization. Such diagrams, also known as models, are graphical representations that generally are composed from a set of pre-defined symbols and connection types. Process models and data models are some of the most prominent types of enterprise models, although organizational charts, entity relationship diagrams, value added chain diagrams, function trees, value stream maps, and the like also are well-known and widely-used enterprise model types.

There are some commercially available software tools that support enterprise modeling. Some of these tools focus on business process modeling, while others have specialized on data modeling, IT planning, and/or the like. Currently, the most prevalent group of commercially available software tools may be classified as being Business Process Analysis (BPA)/Enterprise Architecture (EA) software tools. These tools typically offer a broad spectrum of functionalities, not only for modeling, but also for analyzing and publishing enterprise models. ARIS, MEGA, and Adonis are examples of BPA/EA tools.

Modeling activity usually starts with a group of people discussing the content and structure of the enterprise model. Despite some attempts to support such discussions with software, most of these discussion occur in face-to-face meetings and workshops. The results of these face-to-face meetings and workshops typically are documented during the meeting via whiteboards, flipcharts, and/or the like. This manual process allows models to be developed quickly and interactively, without requiring users to struggle with technology.

At some point (e.g., once the group is satisfied with the result), the content created on the whiteboard or flipchart needs to be transferred into a modeling tool. This transference unfortunately is a tedious task that typically is performed in a fully manual fashion. There accordingly is a substantial "media break" as between the creation of content on the whiteboard or flipchart, and the creation of a corresponding model via a software tool. This media break unfortunately carries costs in that the manual transference process is error-prone, typically requires redundant review exercises, sometimes produces low-quality results (e.g., if there is a lack of understanding in what was created in the real world, how what was created in the real world relates to the computer modeling tool's capabilities, etc.). Thus, there unfortunately is a resource drain associated with this burdensome manual process.

Mobile computing in general allows computer technology to be brought into meeting situations, and modeling software to be used during discussions to capture results directly digitally. With a mobile computing approach, a model can be created in the software in a direct, digital manner, and can be refined and distributed therefrom after the meeting. Mobile computing therefore removes the media break discussed above. Unfortunately, It typically is difficult for groups to focus on the discussion and the results while dealing with modeling program software and associated hardware (e.g., laptop, projector, power line, etc.). Mobile computing solutions also typically allow only one person to provide input at a time (e.g., through a keyboard and/or mouse, etc.). Thus, the ability to accommodate multiple idea contributions in parallel may not be feasible or even possible in many cases. There also is a risk of becoming lost in technical details, as opposed to focusing on the actual subject. Directly using modeling software with a mobile computing may also require technical people familiar with the "ins-and-outs" of software to be present and engaged.

Digital cameras allow for whiteboard results to be captured as a digital picture that can be taken to a desktop computer, loaded onto the computer, and put alongside the modeling software for manual transfer. This approach promotes easy digitization of the whiteboard content, e.g., as a digital picture is a copy of the whiteboard content that can be taken to one's computer workplace with little logistical overhead. Unfortunately, however, the digital picture remains a picture, and a digital model still needs to be created in the modeling software, from scratch, with the picture being only a visual input for the human creator.

Optical Character Recognition (OCR) is a technology that analyzes a digital picture for textual information and retrieves text from it. Digital pictures of a whiteboard model can be analyzed for text components that can be automatically retrieved via OCR. Classical OCR technology unfortunately has difficulty recognizing handwriting and does not recognize symbols and structures of a model. As a result, the resulting text output can miss important structure and connection detail.

Interactive whiteboards provide specific physical boards that recognize manual handwriting and generate digital pictures from it. They may also allow for interactions with software programs projected to the board. Ideally, a group can draw a model on the interactive whiteboard as would be done with a normal whiteboard, with the advantage of having the final model sketch stored as a digital picture. Unfortunately, however, interactive whiteboards come with high hardware costs, and an interactive whiteboard is yet another device to maintain and master in the meeting room. Interactive whiteboards effectively remove the ability to use sticky notes or static shapes, per se. They also have the same or similar disadvantages as digital cameras.

The Symbio Workshop Scanner by Ploetz+Zeller GmbH is a piece of desktop software that takes a digital picture of a process model as an input, analyzes symbols and text, and creates an adequate process model in the Symbio modeling software. Process models created by static shapes on a whiteboard can be digitized automatically. Unfortunately, however, semantics of the modeling objects are determined solely by static shapes to be retrieved from the vendor. The technology is limited to the process flows that are sequences of activities, and there are no complementary model object types (e.g., roles, input, output, IT systems, etc.) possible. Text recognition tends to work well, but there is no machine learning included. On the whole, a classical top-to-bottom flow is very rigid and difficult to handle on classical whiteboards. Configuration possibilities are extremely limited.

The 3M Post-It Plus App allows users to take pictures of arrangements of sticky notes, with smartphones or the like.

Those notes are recognized and provided as single images (without text recognition) to the user. The user may then re-arrange them digitally in the app and add additional digital notes. Thus, sticky notes from a whiteboard advantageously can be digitized automatically and are ready for digital post-processing in dedicated software. Unfortunately, however, there is no recognition of different semantics of notes as desirable in an enterprise modeling software tool. There also is no text recognition functionality when it comes to the notes themselves, and they remain digital but "dumb" images. It thus will be appreciated that the way the sticky notes are arranged on the whiteboard is not translated into any semantic, as there are no predefined, configurable rules.

Certain example embodiments address the above and/or other concerns. For instance, certain example embodiments relate to techniques that help address the media break between whiteboards, flipcharts, and the like, and modeling software and computerized modeling systems. Certain example embodiments provide a solution that helps to solve the problems associated with this technical gap, reduce the manual burden involved in recognizing and transforming a manually-sketched model on a whiteboard platform to a digitized model that fits within an enterprise modeling computer system.

One aspect of certain example embodiments relates to bridging the media discontinuity when models (e.g., business models) are designed on a whiteboard or other physical medium and later need to be stored electronically on a computer in a computerized and standardized modeling language format. Certain example embodiments use a camera and a specialized software application to identify certain graphical elements and text, and then transform the picture into the computerized model. A different modeling "language" may be used on the whiteboard, as compared to what is available on or via the computer. This transformation takes into account that an identical process can be described, advantageously, using a different grammar on a whiteboard than is applicable on a computer. For example, the complex connections between processing steps and also between roles of responsible people, as well as the input and output definitions, might be too complex to draw in the same way on the board as is shown on a computer screen.

Another aspect of certain example embodiments relates to a model type introduced for a whiteboard, which offers certain advantages over the standard computer modeling, while allowing for a clearer processing by the photo-imaging software, e.g., to help uniquely identify each token as being grammatically and semantically correct.

Another aspect of certain example embodiments relates to a multi-stepped or multi-phase transformation where the objects, object types, connection, identified text, etc., can be manually corrected. This multi-pass approach advantageously aids in providing for smoother conversions from one model to the other.

Still another aspect of certain example embodiments relates to an approach for using different modeling languages and a transformation process between two different media (e.g., whiteboard and computer), in order to compensate for the media break between the two.

Advantageously, the suggested language and the transformation may be flexible and adjustable for different requirements of the whiteboard modeling, as well as for the computer model engine. For example, using a multi-step transformation advantageously allows for a transparent way of adjusting the (sometimes very coarse) output from automatic scanning and interpretation hardware and/or software, e.g., for symbol and text recognition.

In certain example embodiments, a system for creating and/or updating a computerized model usable in connection with an enterprise modeling platform is provided. The computerized model is defined in connection with a first modeling language. The system comprises a display device; and processing resources including at least one processor and a memory operably coupled thereto. The processing resources are configured to control the system to at least: receive an image of a hand-drawn model, the hand-drawn model existing on a physical substrate and following rules associated with a second modeling language, the first and second modeling languages being different from one another; perform image processing on the image of the hand-drawn model, the image processing including a plurality of different identification levels, the different identification levels respectively corresponding to recognitions of (a) structures in the image that correspond to objects in the hand-drawn model, (b) object types for the identified structures that correspond to the objects, (c) text associated with the identified structures that correspond to the objects, and (d) connections between at least some of the identified structures that correspond to the objects; and generate a digitized iteratively-reviewed version of the hand-drawn model; and transform the digitized iteratively-reviewed version of the hand-drawn model into the computerized model in accordance with a set of rules defining relationships between elements in the first and second modeling languages. The generation is accomplished by presenting, on the display device and on an identification level by identification level basis, results of the recognitions corresponding to the respective identification levels; and accepting user modification(s) to the results on the identification level by identification level basis.

In certain example embodiments, a system for creating and/or updating a computerized model usable in connection with an enterprise modeling platform is provided. The computerized model is defined in connection with a first modeling language. The system comprises a display device; and processing resources including at least one processor and a memory operably coupled thereto. The processing resources are configured to control the system to at least: receive an image of a hand-drawn model, the hand-drawn model existing on a physical substrate and following rules associated with a second modeling language, the first and second modeling languages being different from one another; perform image processing on the image of the hand-drawn model, the image processing including a plurality of different identification levels, the different identification levels respectively corresponding to recognitions of (a) structures in the image that correspond to objects in the hand-drawn model, (b) object types for the identified structures that correspond to the objects, (c) text associated with the identified structures that correspond to the objects, and (d) connections between at least some of the identified structures that correspond to the objects; and generate a digitized iteratively-reviewed version of the hand-drawn model; and transform the digitized iteratively-reviewed version of the hand-drawn model into the computerized model in accordance with a set of rules defining relationships between elements in the first and second modeling languages. The generation is accomplished by presenting, on the display device and on an identification level by identification level basis, results of the recognitions corresponding to the respective identification levels; and accepting user modification(s) to the results on the identification level by identification level basis.

According to certain example embodiments, the first modeling language may be user-adaptable. It additionally or alternatively may be defined so as to specify semantics of model objects based on coloring and shape; semantics of a model as a function of shapes, colors, positioning, and interconnectedness of its model objects; and implicit information about model objects based on grid location. For example, model objects located in a first column of a grid logically imposed on the physical substrate may be defined as role type model objects, provided that such model objects are in a lane with one or more model objects corresponding to process steps, with roles and process step type model objects being defined to be represented by, e.g., different colors; model objects located in lanes with additional semantic objects may be defined to specify features of model objects corresponding to process steps that are located in the same column, e.g., with model objects located in lanes with additional semantic objects representing input, output, system, and/or timing related semantics; etc.

According to certain example embodiments, the transformation may generate a structured file type understandable by, and communicated to, the enterprise modeling platform.

According to certain example embodiments, the processing resources may be configured to control the system to at least transmit to a repository of the enterprise modeling platform data representative of the transformed digitized iteratively-reviewed version of the hand-drawn model.

According to certain example embodiments, the processing resources may be configured to control the system to at least generate and display in separate layers representations of the recognized objects and the image of the hand-drawn model.

According to certain example embodiments, a camera configured to take a picture corresponding to the image of the hand-drawn model may be provided.

According to certain example embodiments, the processing resources may be incorporated into a mobile electronic device.

According to certain example embodiments, the processing resources may be configured to control the system to at least provide output related to the generation of the digitized iteratively-reviewed version of the hand-drawn model to a machine learning module to improve accuracy of the recognitions.

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages may be better and more completely understood by reference to the following detailed description of exemplary illustrative embodiments in conjunction with the drawings, of which.

DETAILED DESCRIPTION

Figure 1:
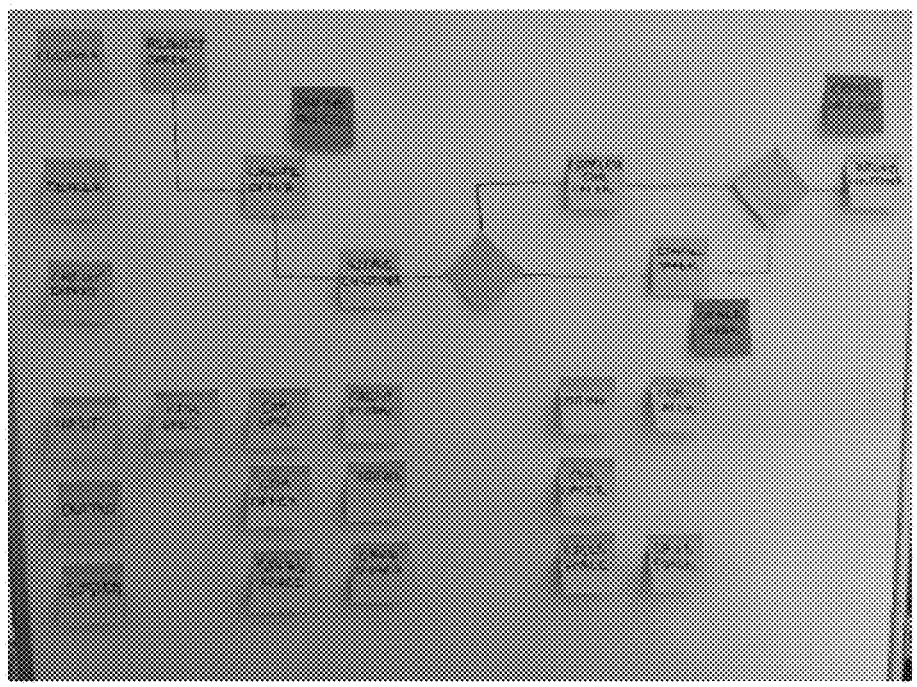
FIG. 1 is an example process model created on a whiteboard and that may be processed using gridding, in accordance with certain example embodiments.

Certain example embodiments described herein relate to grid-based, multi-level, and user-interactive approaches to transforming content created on a whiteboard or the like into a computerized enterprise model usable with an enterprise modeling system. That is, certain example embodiments help transform information created on a whiteboard, flipchart, or the like, into a well-defined digitized model that can be used to create or be combined with a computerized enterprise model usable with an enterprise modeling system. As will be appreciated from the description below, certain example embodiments combine well-structured whiteboard modeling, multi-level interactive image recognition, and mobile technology, in these and related regards.

Example Well-Structured Whiteboard Modeling Techniques

One strength of enterprise modeling is the information richness that is in essence encoded into well-structured formal or semi-formal graphical diagrams, making the information easy to grasp and processable by software. Defining the scope and the details of this information (e.g., details concerning process steps, rules, data, IT systems, organizational units, etc.) is one common objective of work sessions in which different stakeholders meet and collaboratively develop their ideas of the enterprise model. Free-handed sketching of an enterprise model on a whiteboard, flipchart, or the like is a commonly used technique that meets the immediate desire to document the results of the discussion in a simply and low-barrier way. Yet free-hand sketches bring with them some problems, e.g., when it comes to further processing the results after the session. For example, it oftentimes is difficult to automatically recognize symbol sketches. As another example, inherent semantics of the way that information is arranged may not be transferred into the enterprise model during automatic or manual conversion. The vagueness that may accompany an unstructured sketch can make automated digitization, and/or manual transference, of such drawings into an enterprise model an extremely difficult and error-prone task.

Certain example embodiments help reduce the vagueness present in the whiteboarding process in order to prepare the grounds for better digitization results. Certain example embodiments adopt several approaches to reducing the vagueness of making whiteboard-originated models. For example, as will become clearer from the detailed description that follows, using sticky notes arranged on an invisible grid and following specific rules from the beginning helps provide analogous and well-structured input for automated digitization.

First, the coloring and shape of the sticky notes determines semantics of the model object, while helping to avoid vague handwriting and sketching. Second, whiteboarding rules (e.g., modeling conventions) define the semantics of a model as a function of shapes, colors, positioning, and interconnectedness. Third, gridding allows implicit rules concerning how information elements relate to be defined. For example, by structuring the whiteboard as a grid having x- and y-axes, objects can be positioned in rows (lanes) and columns and, thus, the mere positioning of an item into a specific lane and column can be made to carry a defined meaning.

Given a shared understanding of those three aspects, a group can develop a whiteboard model collaboratively and in a way that helps overcome vagueness from the beginning. This eases the burden of the media break between an "analog" enterprise model on a whiteboard, and a digital enterprise model in software. At the same time, the whiteboard model remains an easy way of capturing and understanding provided information.

FIG. 1 is an example process model created on a whiteboard and that may be processed using gridding, in accordance with certain example embodiments. The FIG. 1 example reads from left-to-right, with each process step being represented by a light green sticky note. The lanes are annotated, with roles in the upper medial portion of the first column. Each orange sticky note in the upper medial portion of the first column represents one role (e.g., a business analyst, sales manager, etc.). By positioning a process step in one of these lanes, a modeler documents implicitly that that step is executed by that role.

Below the process flow, in the lower medial portion of the whiteboard, there are additional lanes that introduce additional semantic detail. The input lane is meant for data objects that serve as process inputs. The output lane is meant for data objects that serve as process outputs. The IT lane is meant to specify which software and/or other information technology systems are utilized in the process being modeled. If a sticky note is positioned in one of those three lanes, it represents an item (e.g., data object, software system, or the like) that relates to the process model above. To be more precise, it relates to the very process step that is positioned in the same column as the sticky note. Thus, lane positioning determines the type of the item, and column positioning determines the related process step. For example, a data object "customer order" positioned in the input lane and in the column with the process step "sign order document" represents the fact that the "customer order" is a required input for the "sign order document" process step.

While the lanes in the process model are predefined as role lanes, the lanes below the process flow are typified by the first sticky note. The last three lanes are interpreted, from the top down, to be the "INPUT" (for input data), "OUTPUT" (for output data), and "SYSTEM" (for supporting IT systems) lanes in the enterprise model. Alternatively, or in addition, it is possible to change colors of the sticky notes in the first column to indicate the change in semantics. Also, to avoid having to use different semantics for explicit connection lines other than the process flow, the sheer proximity of "problem"-objects to "process steps" defines an implicit relationship. As will be appreciated from the description below, "problem"-objects in this example refers to the sticky note object named "risk/problem notes" in the table below.

Example Multi-Level, Interactive Image Recognition Techniques

The automated process of transferring an image taken into an enterprise model is broken down into multiple, interactive steps. This multi-step procedure allows for corrections to be made early, and for the general quality of the generated digital model to be improved.

The first step involves overall image recognition. In this first step, the image is processed to identify objects and explicit relationships. The user is shown a layer of all recognized structures. Here, the user may see whether all information has been grasped by the processor, at least at a basic level. If not, the user may need to check the whiteboard and/or environment, e.g., to ensure that there is sufficient lighting, no unwanted shadowing or reflections, proper or exact positioning, etc., and re-take the picture.

The second step involves object recognition. In this second step, each sticky note is identified as a specific object type, depending on its color, shape, and positioning. For each object, the image is cropped to the area of the sticky note, and stored so as to be associated with the object. Those object images and their derived object types are presented to the user. The user may review the types and correct them, if necessary.

The third step involves text recognition. In this third step, each object name is derived, with the usage of a handwriting text recognition or other like mechanism. The user is presented with the opportunity to review the results and edit the names, if necessary. By correcting mistakes, the user teaches the mechanism, which may learn for subsequent text recognition tasks.

The fourth step involves implicit and explicit relationship recognition. In this fourth step, each object is analyzed for explicit relationships (shown graphically as arrows on the whiteboard) and for implicit relationships (expressed by the grid positioning) to other objects. All relationships are listed and may be reviewed and/or corrected on a per-object basis.

Example Use of Mobile Technology

Certain example embodiments may include a software application such as, for example, a mobile application that runs on a smartphone, tablet, laptop, and/or the like. The fact that most contemporary smartphones are equipped with an integrated digital camera facilitates integrating image capturing and/or image processing functionality in a mobile device, for example. Thus, most of the interactive work can be done on-site, e.g., without a desktop computing device.

With images captured by the user using an electronic device and in the absence of specialized hardware (such as, for example, an electronic whiteboard), certain example embodiments may include robust processing resources, e.g., to work with potentially low-quality bitmap and/or other source images. Some or all of the following and/or other issues may be considered: image quality defined by resolution, compression level, light, contrast, etc.; bent, creased, crumpled, or otherwise partially damaged sticky notes and resulting shadows and/or imperfections in size and shape; reflections and the presence of other non-whiteboard related content; implementation for different platforms, such as iOS and Android operation systems; detection of handwritten characters and text; different thicknesses, colors, and types of connection lines and characters (e.g., solid lines as opposed to dashed and dotted lines, cursive as opposed to print characters, lowercase as opposed to proper-casing of letters, etc.); overlapping sticky notes and detection of their positions in the grid; different shaped and colored sticky notes; multiple connection lines connecting sticky notes; and/or the like.

Example Implementation

Details concerning an example implementation are provided below. It will be appreciated that this example implementation is provided to help demonstrate the concepts of certain example embodiments, and aspects thereof are non-limiting in nature unless specifically claimed. For example, descriptions concerning the use of mobile devices and apps, the use of specific gridding conventions, mapping rules, etc., are non-limiting in nature unless specifically claimed.

In certain example embodiments, mobile devices and their integrated cameras may be used to automatically transfer physical models generated using sticky nodes and/or the like on whiteboards into a computerized enterprise modeling platform. For example, certain example embodiments use the ARTS process model, and an ARIS Pict2Model application running on a mobile device implements integration with the device's camera and the image processing functionality, while also enabling human interaction, e.g., for editing the processed results, uploading the model to an ARIS repository, etc.

Figure 2:
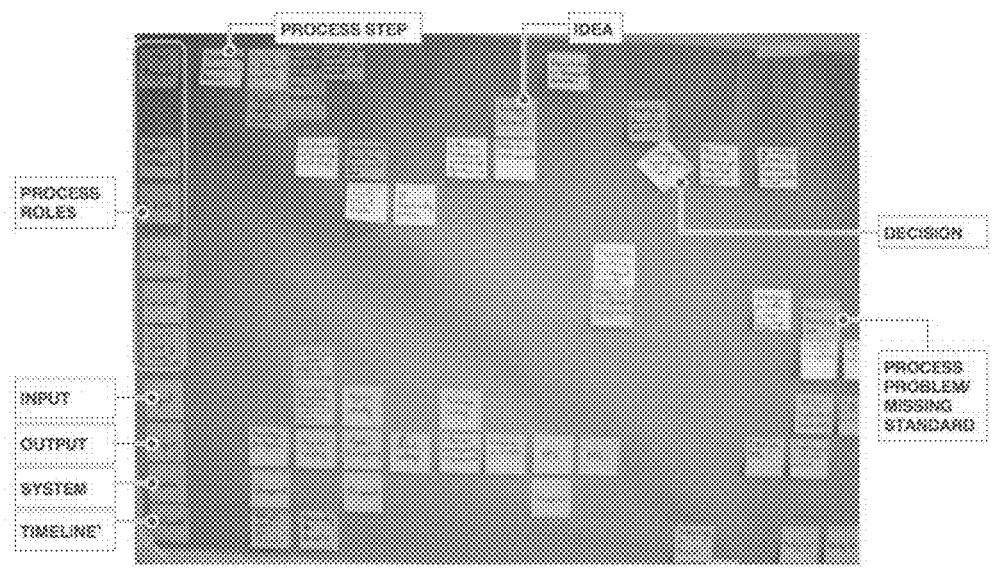
FIG. 2 is another example process model created on a whiteboard and using sticky notes, which may be processed using whiteboard modeling rules and gridding, in accordance with certain example embodiments.

FIG. 2 is another example process model created on a whiteboard and using sticky notes, which may be processed using whiteboard modeling rules and gridding, in accordance with certain example embodiments. The colored sticky notes are used to displace different types of contents, and the upper swimlanes represent different roles while the lower swimlanes represent other implementation-related technical details as defined by the content of the sticky notes in the respective first columns. Process steps, ideas, decisions, and process problems/missing standards, also are included and identified in defined and consistent manners in the FIG. 2 example. The lower swimlanes may be different for different processes. For instance, the timeline swimlane may be replaced by, or supplemented with, other aspects such as, for example, lead time, process time, etc.

Certain example embodiments make use of a set of predefined modeling rules. As will become clearer from the description below, aspects of the rules may include, for example: the object types represented by differently shaped and colored sticky notes, the lane semantics, the direction of the flow (left-to-right, top-to-bottom, etc.) as well as the semantics of the connections, etc.

In certain example embodiments, the set of predefined modeling rules may be adaptable, e.g., to update the set or create a new set. In this regard, certain example embodiments may include a configuration module or component that allows users to configure the modeling rules, e.g., via a user interface or wizard and without any specific coding or compilation requirements. Using this tool, users may define rules regarding how they layout their whiteboard models according to their own needs, and then configure the rules accordingly in the configuration component of the application. The application may in some instances offer a predefined set of roles typically used for process modeling, data modeling, organizational charting, etc., which can be adapted. The users may adapt all aspects of the rules including, for example: the object types represented by differently shaped and colored sticky notes, the lane semantics, the direction of the flow (left-to-right, top-to-bottom, etc.) as well as the semantics of the connections, etc.

An example set of predefined modeling rules (relating to model and object types) that may be used in connection with certain example embodiments is as follows:

| Enterprise Model Type: Process Model | Objects | Comment |
| --- | --- | --- |
| Flow (Left-to-Right) | Process Step (one per column) Decision rules without logic No (start/end) events Idea notes (green) closely positioned to the respective process step Risk/problem notes (red) closely positioned to the respective process step | |
| Lanes | Roles | Process steps positioned in a specific role lane are to be executed by this role. |
| | Input | Data objects positioned in the input lane represent input objects for the process step in the respective column. |
| | Output | Data objects positioned in the output lane represent output objects for the process step in the respective column. |
| | System | System objects positioned in the input lane represent IT-systems supporting the process step in the respective column. |

In addition to the set of rules reflecting model and object type mappings, the set of rules additionally may reflect mappings related to the connection types between two (or more) objects including source and target objects. The following table lists the different types of connections that may be used in the whiteboard model in certain example embodiments. As will be appreciated from the table below, they differ in their semantics and in the way that they are represented graphically. Explicit connections are drawn as a line between the two objects. Implicit connections are described by the lane and column positioning. Proximity connections are defined by two adjacent sticky notes that are positioned very close to each other. Thus, the following table helps provide an example of how the transformation from the recognized objects and relationships established by the gridding rules into a well-defined computerized model can be performed. For example, the transformation may be between gridding rules and ARIS (connection) types in certain example embodiments. As above, these rules may be adaptable, e.g., depending on the computerized modeling system, and using the component or module mentioned above.

| Source Type | Target Type | Connection Representation Type | Connection Type | Cxn Type in the Computer-Supported Solution (Enterprise Modeling Tool) |
|---|---|---|---|---|
| PROCESS STEP | PROCESS STEP | Explicit or Implicit | is predecessor of | CT_IS_PREDEC_OF_1 (118) |
| PROCESS STEP | DECISION | Explicit or Implicit | leads to | CT_LEADS_TO_1 (116) |
| DECISION | PROCESS STEP | Explicit or Implicit | activates | CT_ACTIV_1 (43) |
| PROCESS ROLE | PROCESS STEP | Implicit by lane/column gridding | carries out | CT_EXEC_1 (65) |
| PROCESS PROBLEM | PROCESS STEP | Proximity | refers to | CT_REFS_TO_2 (728) |
| INPUT | PROCESS STEP | Implicit | is input for | CT_IS_INP_FOR (49) |
| PROCESS STEP | OUTPUT | Implicit | has as output | CT_HAS_OUT (50) |
| SYSTEM | PROCESS STEP | Implicit | supports | CT_CAN_SUPP_1 (221) |

With respect to object type recognition, to determine the type of a sticky note, certain example embodiments analyze its position in the grid. The following table provides example rules which, as above, may in some instances be adapted by the user.

| | |
|---|---|
| Process Step | All objects not being a Role/Input/Output/System, Decision or Problem |
| Roles/Input/Output/System | First Column. Input, Output and System represented top down in the last 3 rows of the grid. Alternatively a different color from Role type is used for Input, Output and System types. |
| Decision | All objects rotated by ~90 degrees |
| Problem | Identified by a configurable color for the sticky notes used |

Additional rules may be specified as well. Additional rules may include, a prohibition on overlapping sticky notes, a requirement for different colors as between the background of the whiteboard and sticky notes (e.g., no white sticky notes on a white background), minimum and/or maximum sizes for sticky notes and/or other objects, etc.

Figure 3:
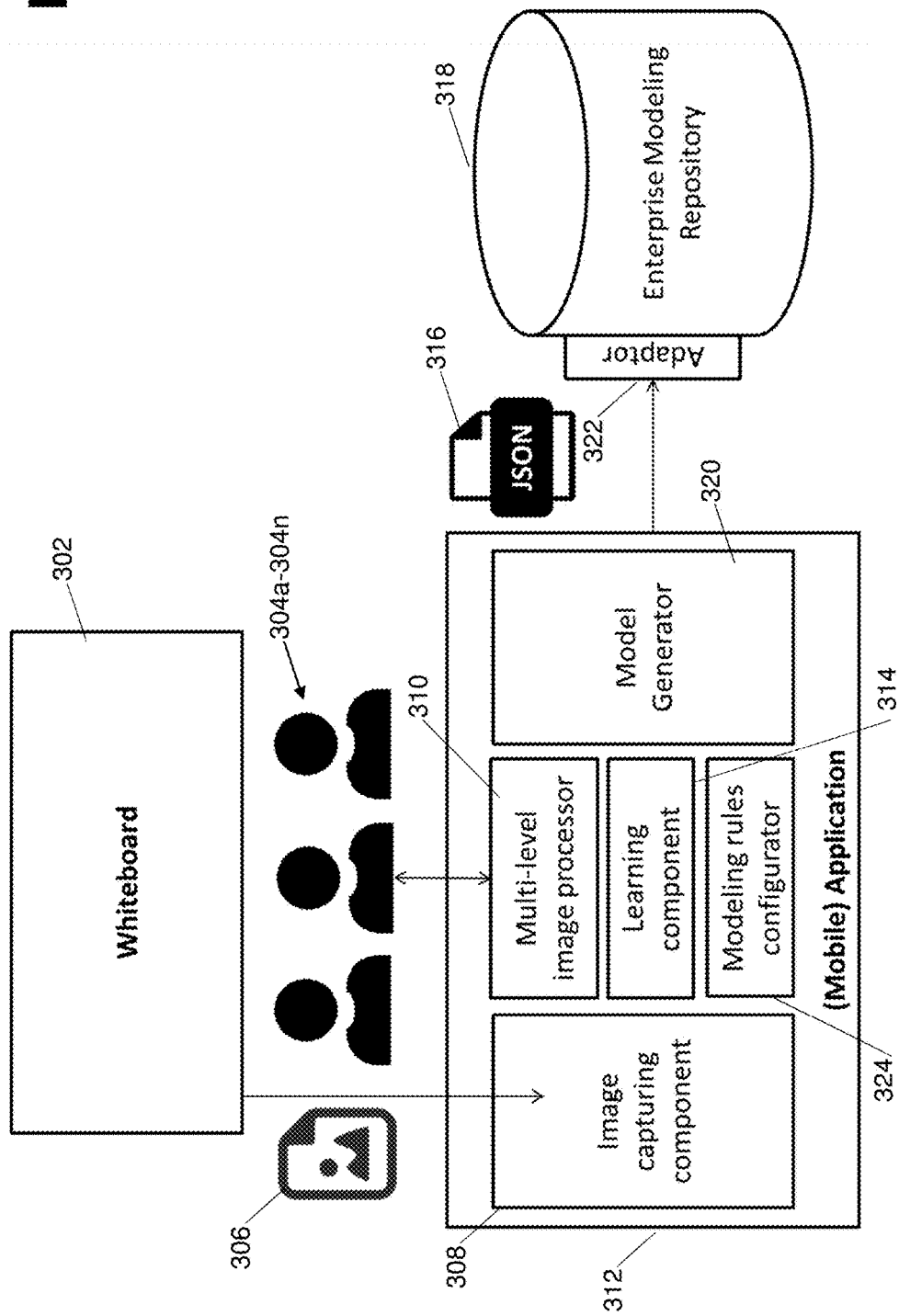
FIG. 3 is a block diagram showing example components of a system that may be used to convert a whiteboard model into an enterprise model, in accordance with certain example embodiments.

FIG. 3 is a block diagram showing example components of a system that may be used to convert a whiteboard model into an enterprise model, in accordance with certain example embodiments. The whiteboard 302 shows the analog enterprise model, which adheres to the predefined and agreed modeling rules with sticky notes. The users 304a-304n create the enterprise model based on the agreed rules on the whiteboard 302. They take a picture 306 of the model supported by the image capturing component 308 and interact with the multi-level image processor 310 component of the application 312.

The image capturing component 308 is a standard camera component as provided by most mobile operation systems, and it may provide a software and/or hardware link to a camera provided by the device hosting the application 312. The users 304a-304n use the image capturing component 308 to take the picture 306 of the model generated on the whiteboard 302. This picture 306 is then handed over to the multi-level image processor 310.

The multi-level image processor 310 takes the digital picture 306 from the image capturing component 308 as an input and analyzes it in multiple steps. As alluded to above, and as explained in greater detail below, it offers interim results to the users 304a-304n, e.g., for reviewing, editing, and/or other purposes. It also may provide input continuous machine learning (e.g., in connection with the machine learning component 314).

Data recognized by the multi-level image processor 310 and reviewed by the users 304a-304n is consolidated into a structured exchange format file 316 (e.g., a JSON, XML, or other file format) that represents the final model. The users 304a-304n may choose a target model from the enterprise modeling repository 318 or decide to create a new model. The file 316 is then transmitted from the model generator and transmitter component 320, which facilitates these operations and works with a transceiver of the underlying device, to an adaptor 322 of the repository 318. The adaptor 322 may be configured to receive information over a wireless or wired network (such as, for example, the Internet). It may operate using APIs, web service calls, and/or the like.

The enterprise modeling repository 318 receives the structured file 316 through its adaptor 322. The received enterprise model structures and objects are compared against the target model, which is updated accordingly. If there is no target model selected, the file 316 data is transformed into a new enterprise model. The updated or new target model is stored to the repository 318, which may be backed by non-transitory computer readable storage medium on a computing platform including processing resources comprising at least one processor and a memory.

The learning component 314 takes the feedback from the users 304a-304n and the multi-level image processor 310 during the interactive image processing and adapts its recognition rules accordingly, e.g., based on a machine-learning technique.

The modeling rules configurator 324 is a configuration unit that allows the user upfront to adapt the modeling rules (e.g., specifying, for example, lane semantics, coloring semantics, etc.), which are taken as a basis for the image recognition and operations performed using the multi-level image processor 310.

It will be appreciated that any suitable number of users 304a-304n may participate in the various operations described in connection with FIG. 3. For example, in some instances, multiple users may be involved in creation of the whiteboard model, only one user may be responsible for taking a picture via the image capturing component 308, one user may interact directly with the multi-level image processor 310 alone or with verbal or direct physical input from one or more other users, etc.

It also will be appreciated that the application 312 may be hosted on one or more different computer systems. The computer system(s) may include respective processing resources such as, for example, at least one processor and a memory operably coupled thereto. A camera may be in-built or connected thereto, and/or the picture 306 may be received in some other way (e.g., as a file download, after being at least temporarily stored to and retrieved from a memory card of a camera, etc.). In certain example embodiments, the application 312 and all of the components shown therein in the FIG. 3 example may be hosted by a mobile device such as, for example, a smartphone, tablet, or the like. A mobile device may include an in-built camera. In other cases, the application 312 and all of the components shown therein in the FIG. 3 example may be hosted by a personal computer (PC) or the like. A PC may include an in-built camera or have a camera connected thereto.

In certain example embodiments, some or all of the functionality of the components shown in the application 312 may be performed locally. For example, an image may be captured locally in connection with the image capturing component 308 but digitally processed in connection what he multi-level image processor 310 at least remote from the device backing the application 312. For example, object and handwriting recognition may be performed remotely based on web service, API, or other calls from the device hosting the application 312. User input received at the device hosting the application 312 may provide input to such calls (e.g., confirming object detection, refining handwriting recognition, etc.). In certain example embodiments, some or all of the functionality of the components shown in the application 312 may be realized by having software modules configured to perform the functions described herein. Those software modules may be a part of the application 312, and they may be stored in a memory of the device backing the application 312 and executable using the device's processing resources.

Figure 4:
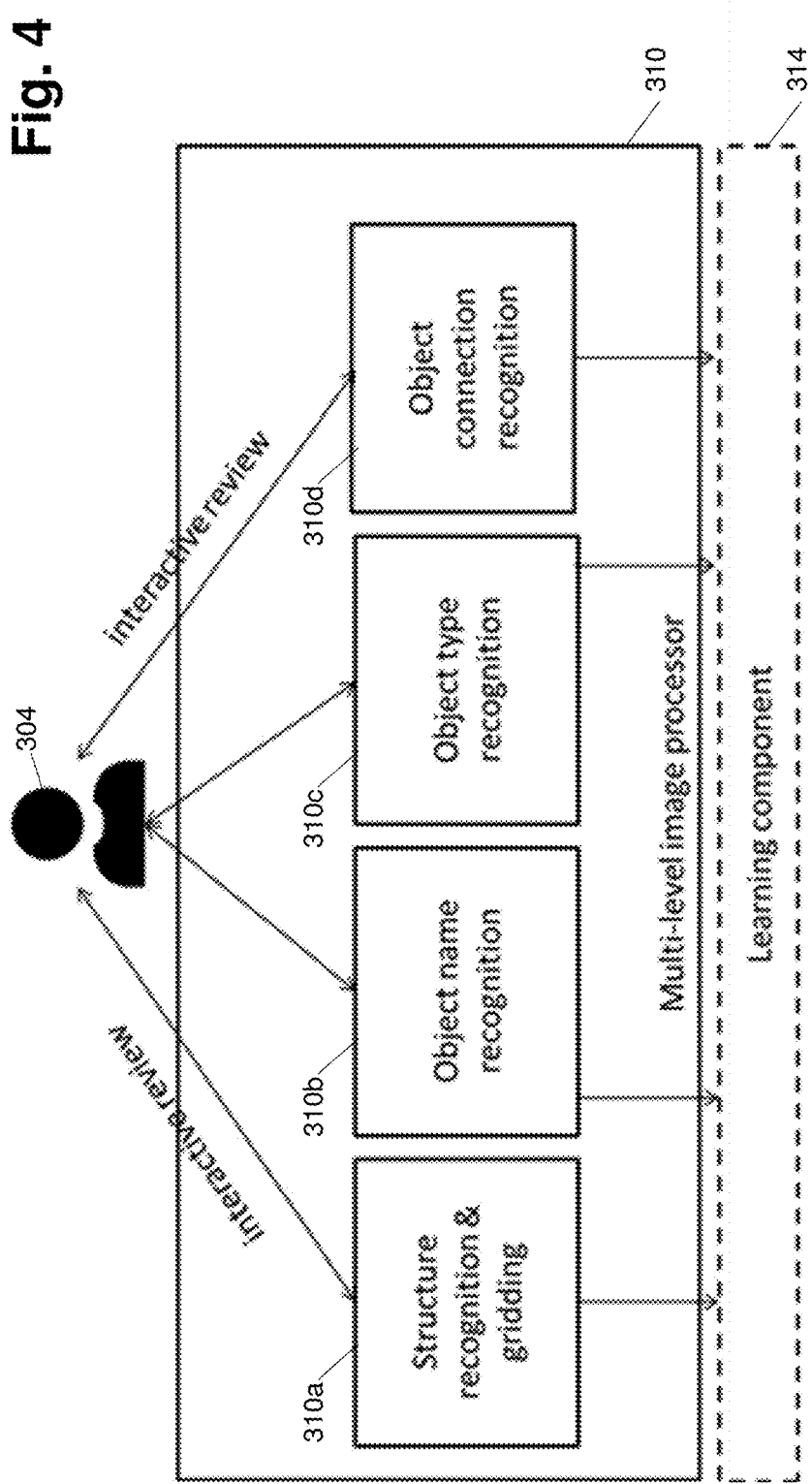
FIG. 4 is a block diagram showing how the user-interactive multi-level image processing techniques of certain example embodiments may operate.

FIG. 4 is a block diagram showing how the user-interactive multi-level image processing techniques of certain example embodiments may operate. FIG. 4 shows a given user 304 working with the multi-level image processor 310 of FIG. 3. As alluded to above, the Multi-level image processor 310 is responsible for retrieving model-relevant information from the digital image 306. For early quality assurance and continuous learning purposes, it analyzes the image 306 in a stepwise manner and asks the user 304 for interim feedback. As shown in FIG. 4, there are four steps and thus four types of ways to iteratively improve the transformation. These four steps include structure recognition and gridding 310a, object name recognition 310b, object type recognition 310c, and object connection recognition 310d.

The first step involves structure recognition and gridding 310a. Based on the contours of the sticky notes, objects are identified and color-coded. They are assigned to lanes and columns based on their x-y positioning in this grid. Explicit connections are recognized and also assigned to outgoing and incoming objects. This information is displayed graphically, and may be layered on top of the image 306 and presented to the user 304 for review (e.g., to correct placements, indicate that certain structures are missing or erroneous detected, etc.). The result is fed into the learning component 314 for further training related to the structure recognition.

The second step involves object name recognition 310b. Within the contours of the single objects, the application analyzes the handwriting and retrieves digital text as strings. The results are presented to the user 304, who may edit the strings if needed or desired. The result is fed into the learning component 314 for further training related to the textual recognition.

The third step involves object type recognition 310c. Based on the colors and text, the object types are determined and presented to the user 304, for possible additional editing (e.g., specifying different object types, correcting object type misidentifications, indicating that certain objects have been missed, etc.). Again, the feedback is fed into the learning component 314 as input for further improvement.

The fourth step involves object connection recognition 310d. Based on the object types, connections between objects are typified and presented to the user 304, for possible additional editing (e.g., to refine connection types, to indicate that some connections were not identified or erroneously identified, etc.). The feedback contributes to the learning component 314 for further improvement.

Figure 5:
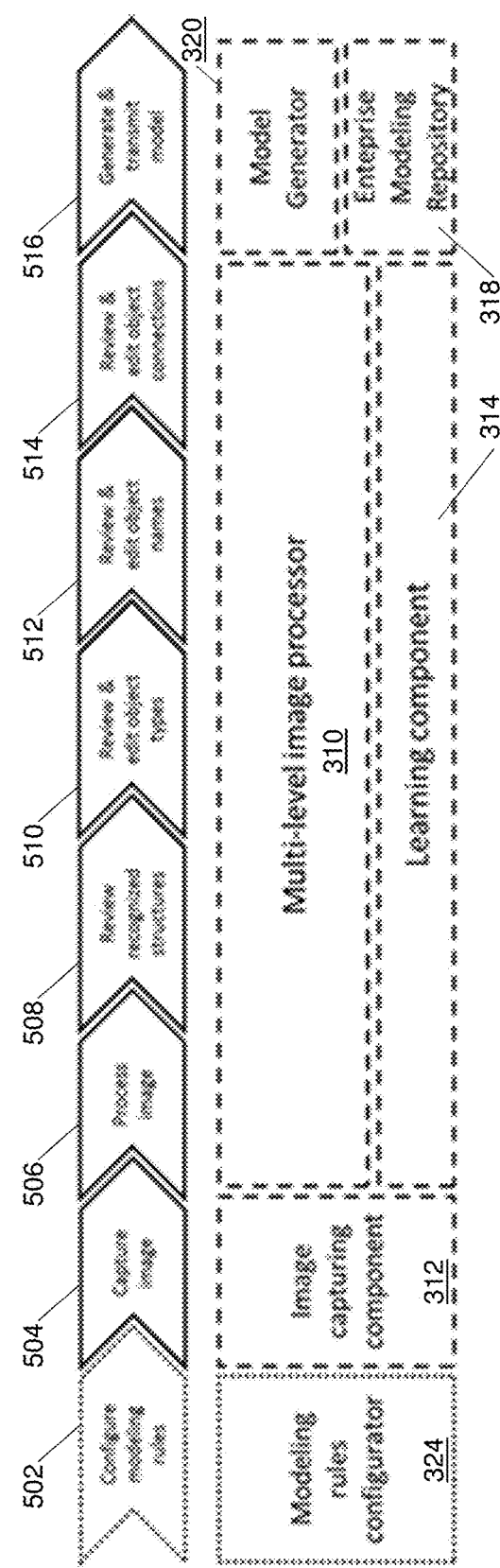
FIG. 5 is an example workflow, which may be used in connection with certain example embodiments.
Figure 6:
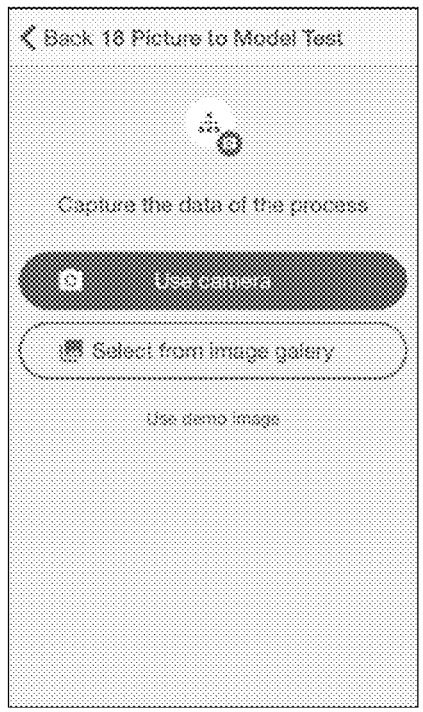
FIGS. 6-13 are example screenshots which may be generated in connection with various operations shown in and described in connection with the FIG. 5 example workflow.

An example use case will now be discussed in connection with the interactive workflow shown in FIG. 5, and the example screenshots shown in connection with FIGS. 6-13. Although the process could begin with configuring modeling rules in step 502 and using the modeling rules configurator 324, for the sake of simplicity, it is assumed that modeling rules are predefined and do not need to be configured further. This example use case therefore in essence begins with step 504, in which an image is captured. The user opens the mobile app on a smartphone or other device, and either takes a picture with the in-built camera, reuses an existing image from the device's gallery, etc. FIG. 6 is an example screenshot showing these options.

Figure 7:
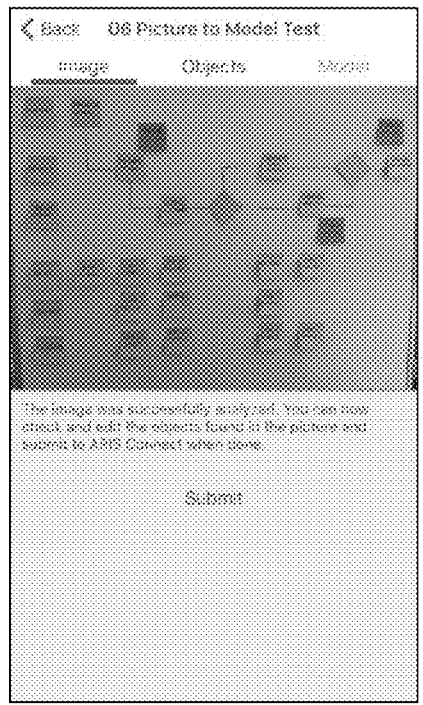
Figure 8:
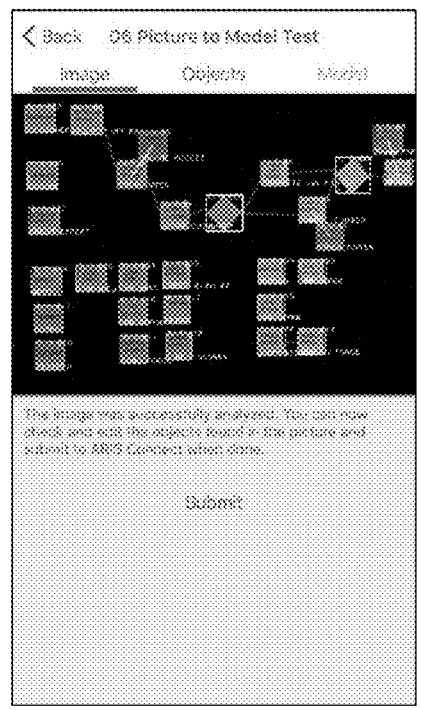

Image processing begins in step 506 and, once the image is successfully analyzed, the FIG. 7 example screenshot may be presented. This screenshot shows the image, alerting the user that it has been successfully analyzed, and prompting the user to check and potentially edit the objects found before submitting them to the enterprise modeling system (which in the case of the FIG. 7 example, is ARIS).

In step 508, the user has a chance to review the recognized structures. When the user selects the image in FIG. 7, the retrieved and computed structural information is displayed, as indicated in the FIG. 8 example screenshot, which shows the original image with overlaid retrieved and computed structural information. If the user indicates that some structural information is missing, the user may dismiss this result, rearrange the whiteboard model for better results (e.g., adjusting for lightning, shadow, reflection, and/or other issues), and re-take the picture. In other cases, the user may directly annotate the markup, indicating that a recognized structure should not be present, defining the boundaries and/or other type information for an initially unrecognized structure, cropping the image, etc.

Figure 9:
Figure 10:
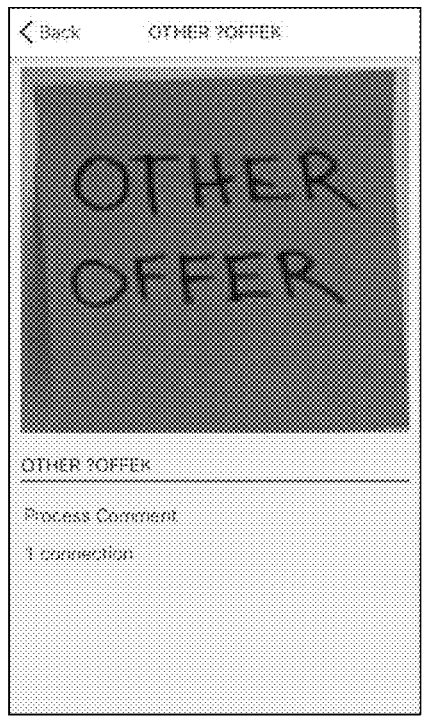
Figure 11:
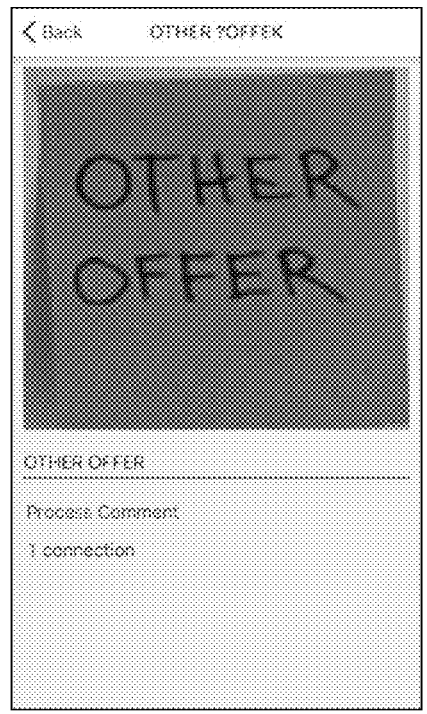

In steps 510, 512, and 514, the user is able to review and edit if necessary or desirable recognized object names, types, and connections. FIG. 9 is an example screenshot, where all objects are listed. A thumbnail image corresponding to the object, along with the recognized text, comments, connection information, and/or the like, are included in FIG. 9. Selecting an object from the FIG. 9 example screenshot presents a larger screen through which the user can make changes. FIG. 10, for example, shows that the handwritten "OTHER OFFER" text has been identified as "OTHER ?OFFEK". The object's name can be edited, with the text being updated as indicated by the FIG. 11 example screenshot. It will be appreciated that other details also may be edited including, for example, object type information; number, placement, and/or types of connections; etc.

Referring once again to FIG. 5, it will be appreciated that steps 50-514 may be facilitated by the multi-level image processor 310. It also will be appreciated that information resulting from the steps (including corrections, implicit or explicit confirmation of accuracy of object and/or text recognition, etc.) is fed to the learning component 314, e.g., to help improve accuracy for future uses.

Figure 12:
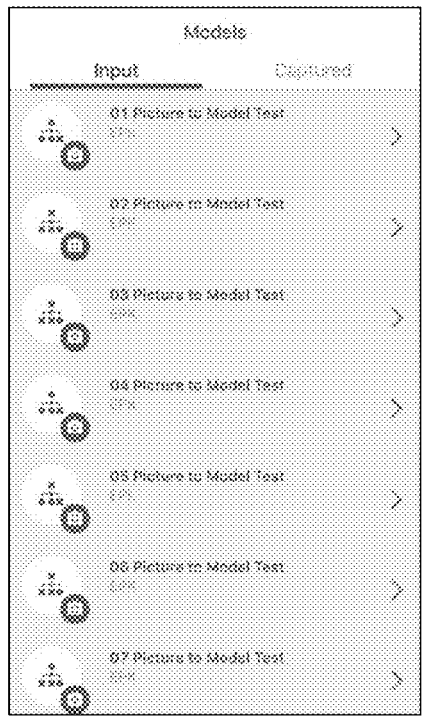
Figure 13:
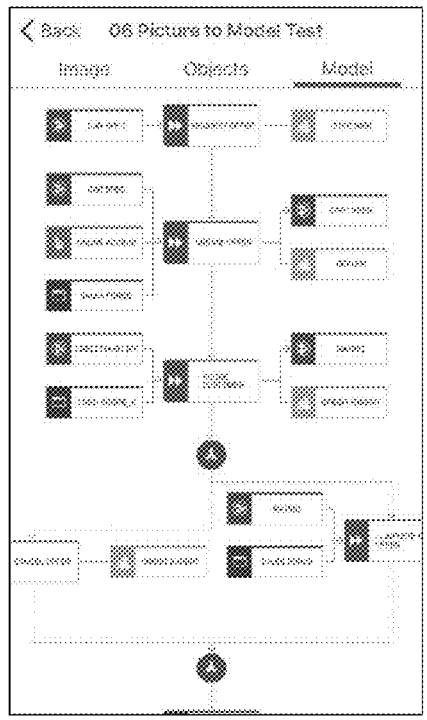

Step 516 is practiced in connection with the model generator 320 and the enterprise modeling repository 318. If the user presses the "submit" button in FIG. 7 or FIG. 8, or navigates to the model screen, the user may choose a target model from the models stored in enterprise repository 318 in order to define the position in the overall enterprise architecture as maintained in ARTS. FIG. 12 is an example screenshot supporting the selection of a target model. The user may also specify that a new model should be created. Once a target is specified, the structured file is generated and transmitted to the repository adapter. The mobile application receives an image of the created/updated model from the repository and presents this model image to the user when he clicks to "model," e.g., as indicated in the FIG. 13 example screenshot.

A variety of underlying technical approaches may be used for object recognition, gridding, connection identification, etc. For instance, certain example embodiments may use open source frameworks (such as, for example, OpenCV and/or Tessaract) for processing the incoming image, and for performing the underlying image transformations and character recognition used to detect enterprise modeling relevant objects and shapes (e.g., sticky notes, connection lines and text). OpenCV is a library of programming functions, mainly aimed at real-time computer vision. It includes a statistical machine learning library for recognizing handwriting. This library may be used in certain example embodiments, e.g., for low-level image transformations during image processing and analysis. Tesseract is an optical character recognition engine for various operating systems. Tesseract is considered by some to be one of the most accurate open source OCR engines currently available, and it can be trained by machine learning to adjust to individual handwriting styles. Tesseract may be used in certain example embodiments, e.g., for handwriting recognition. Of course, other open source and/or propriety implementations may be used in connection with different example embodiments.

The recognition of relevant objects in the image may be based on detection of relevant color ranges (e.g., clusters). Based on the color of the sticky notes and the background color in the source image, a color range may be created. Color ranges may be used to identify the sticky notes and filter unwanted noise, such as shadows, light based reflections, etc. Color range detection also may enable certain example embodiments to avoid requiring assume any particular colors for the sticky notes and background color used for whiteboard model, thereby enabling the user to use any available color of sticky notes on any color background. Alternatively, the colors of the background and supported sticky notes could be configured manually.

To identify the color ranges in the source image, the image may be read as bitmap or other file type from the camera or the device image gallery. It initially may be converted into an OpenCV BGR matrix, which is an n-dimensional array (with each dimension representing a specific color). The BGR image then may be converted into an HSV (Hue Saturation Value) image, which enables the mechanism described below (or other similar mechanism) to be used filtering and identifying relevant colors.

Figure 14:
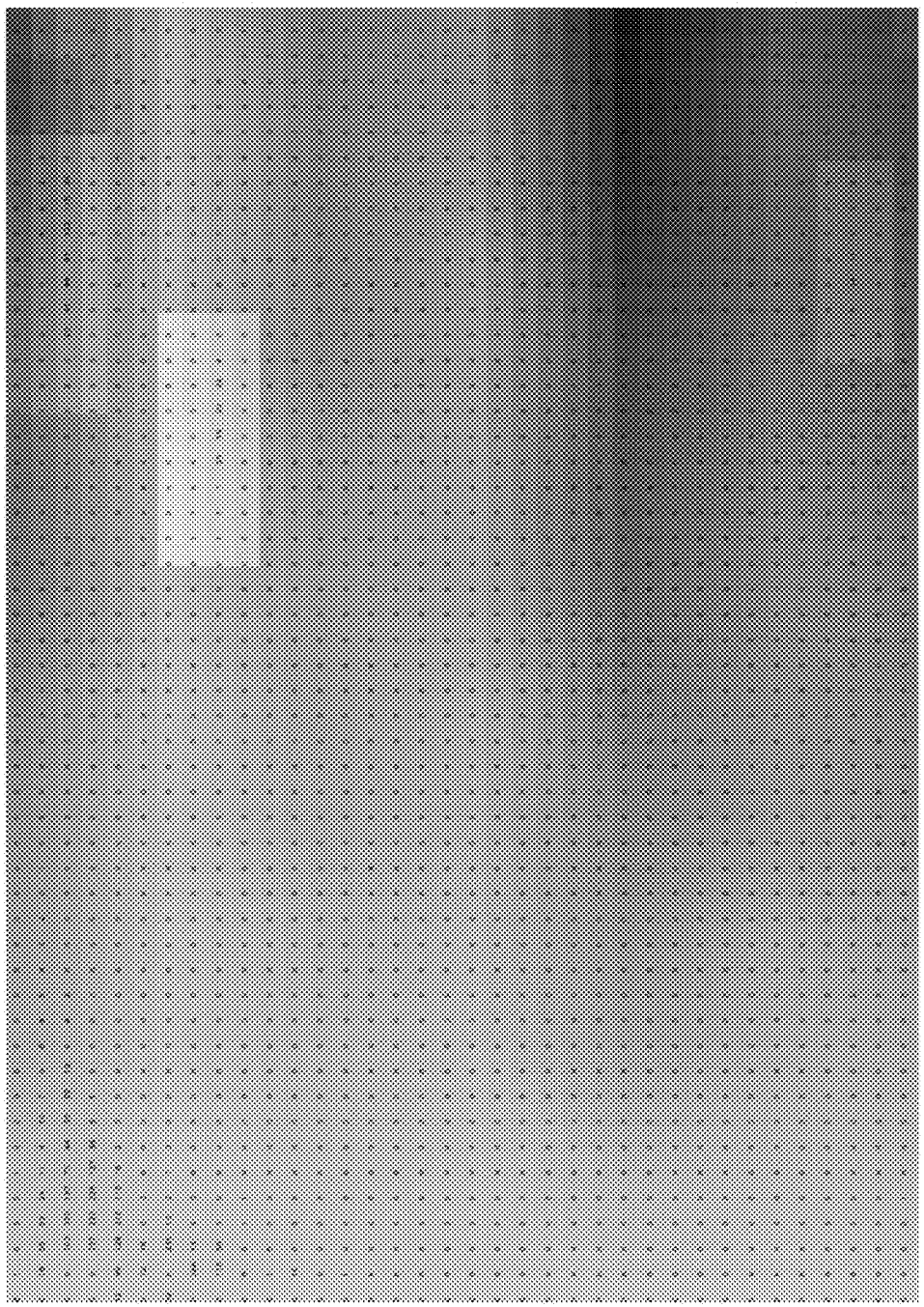
FIG. 14 is a visualization of an example histogram, which may be used in connection with object recognition techniques in certain example embodiments.

To identify the color ranges in the source image, the image histogram may be calculated using the OpenCV method "calcHist". FIG. 14 is a visualization of an example histogram. The x-axis is a saturation that increases from left to right, and the y-axis is its hue. The numbers are normalized amounts of pixels.

Neighbor bins in the x-axis with non-zero amount of pixels may be grouped into ranges. Neighbor ranges in y-axis may be grouped into combined ranges. A combined range with the most amount of pixels is considered to be the background color. Normally, its saturation value will be relatively low and, on a histogram, be located closer to the left side. Ranges with too small amounts of pixels (e.g., currently less than 10% from the average) may be ignored, as well. All other combined ranges may be considered as dominant colors in the image, potentially representing sticky notes.

After color ranges are defined, a color recognition may take place. A color name may be assigned to every color range based on its average hue value and predefined named color ranges.

Figure 15:
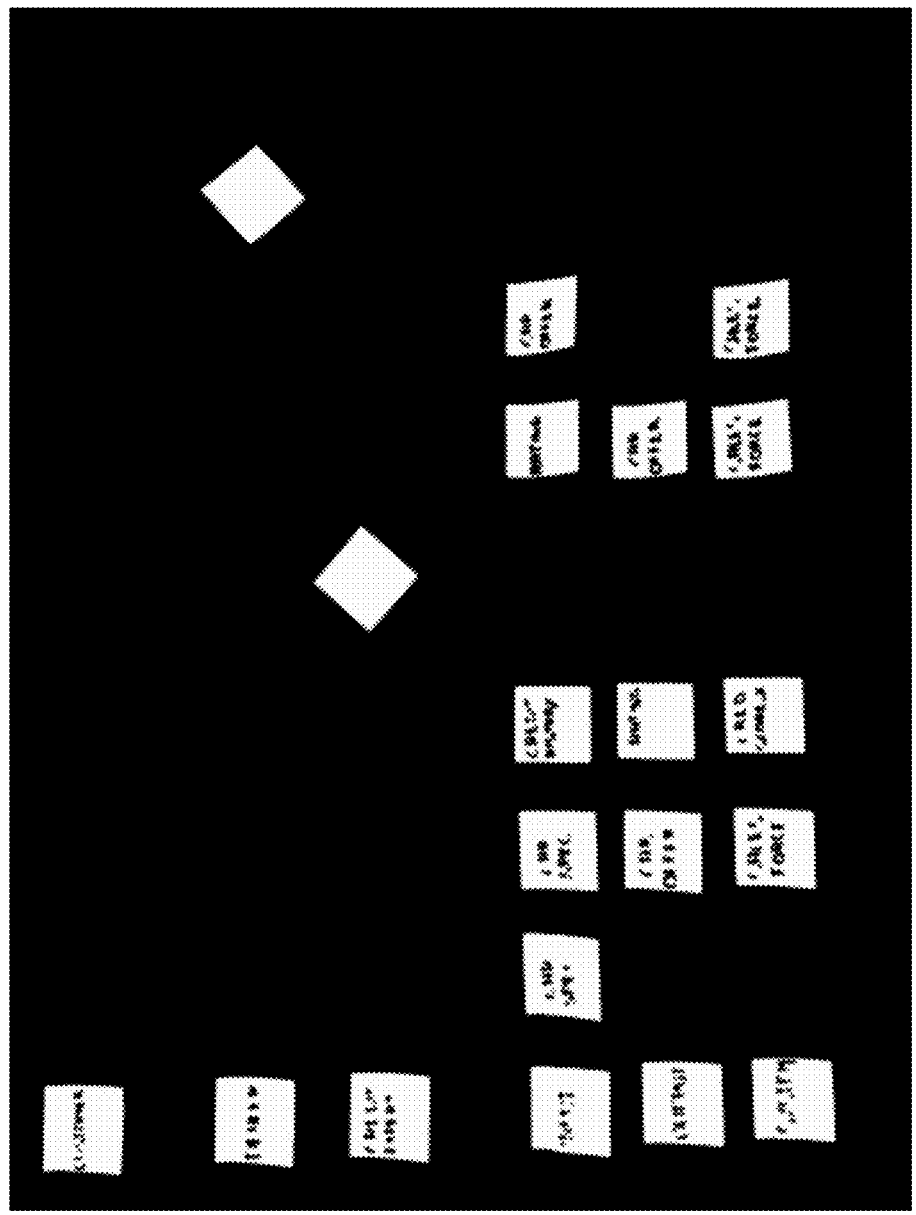
FIG. 15 is an example binary image that may be created in the process of identifying objects, in accordance with certain example embodiments.

To extract sticky notes from background, the "inRange" method of OpenCV may be used for every found color. It may convert the HSV image into a binary image using an original image and color range as input. See FIG. 15, which shows an example binary image. To improve stability of contour detection, some blurring or transformation methods (e.g., "GaussianBlur", "medianBlur", "erode", etc.) may be applied before and/or after the "inRange" method.

Figure 16:
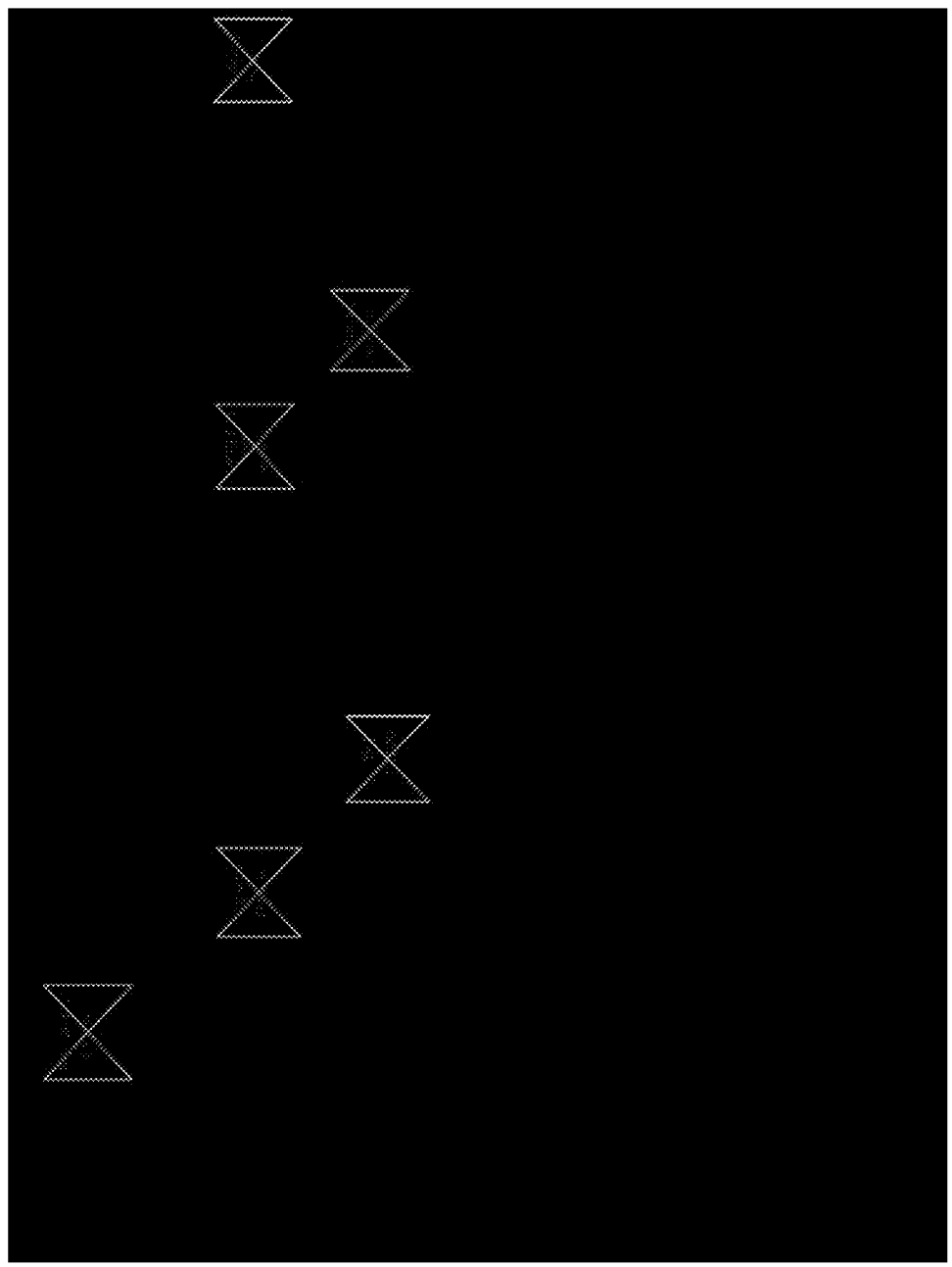
FIG. 16 is an example image that shows how sticky notes may be identified from a binary image, in accordance with certain example embodiments.

A "findContours" method call followed by an "approxPolyDP" method call may be applied to the binary image to identify sticky notes. The second method, "approxPolyDP", can be applied a second time (potentially with less accuracy) if the first call has not returned 4 points (e.g., for representing rectangles). A threshold may be used to filter irrelevant rectangles and avoid false positives, e.g., by defining a minimum size. FIG. 16 is an example showing results of these two method calls. In FIG. 16, the green colored objects indicate that the function "approxPolyDP" was applied once, and the blue colored objects indicate that this function was applied twice. Contours colored with red will be ignored.

If two sticky notes are located too close to each other, they may be recognized as one sticky note. To potentially handle this case, the median of all available areas may be used to split the combination into two or more separated sticky notes.

After detecting the sticky notes area within the image, relevant information may be available to help determine the x-y position in a virtual grid on the whiteboard and to help extract the sticky note itself for further processing (such as, for example, for text recognition).

The gridding may begin with calculating the median width and height of all notes. Multiplied with a configurable factor, these values may be used as threshold for making decision as to whether the sticky note belongs to the current row/column or to a new one. Column and row assignment may be performed as two separate but similar steps that may be executed in any order. For example, column assignment may be performed using the following algorithm, whereby only X-coordinate is considered:

1. Sort all notes by their center position.
2. Set current column to 0, and assign it to the first note from the sorted list.
3. Update the middle coordinate of the current column. This will be calculated as sum of all notes' centers that belong to one column, divided by its amount (e.g., amount of sticky notes that belong to the current column)
4. Get the next note from the list.
5. Check if the note center is close enough to the middle of column. Recently calculated median width with some factor can be used as a threshold for column assignment.
6. If the note is close enough, then assign the current column to the note and update the column's center.
7. Otherwise, increase the column by 1, assign it to the note, and update the new column's center.
8. Repeat steps 4-7 while the list is not empty.

The same algorithm may be applied to the notes to assign rows. As opposed to column assignment, the y-coordinate may be used and, for step 5, median height and not median width may be used.

Figure 17:
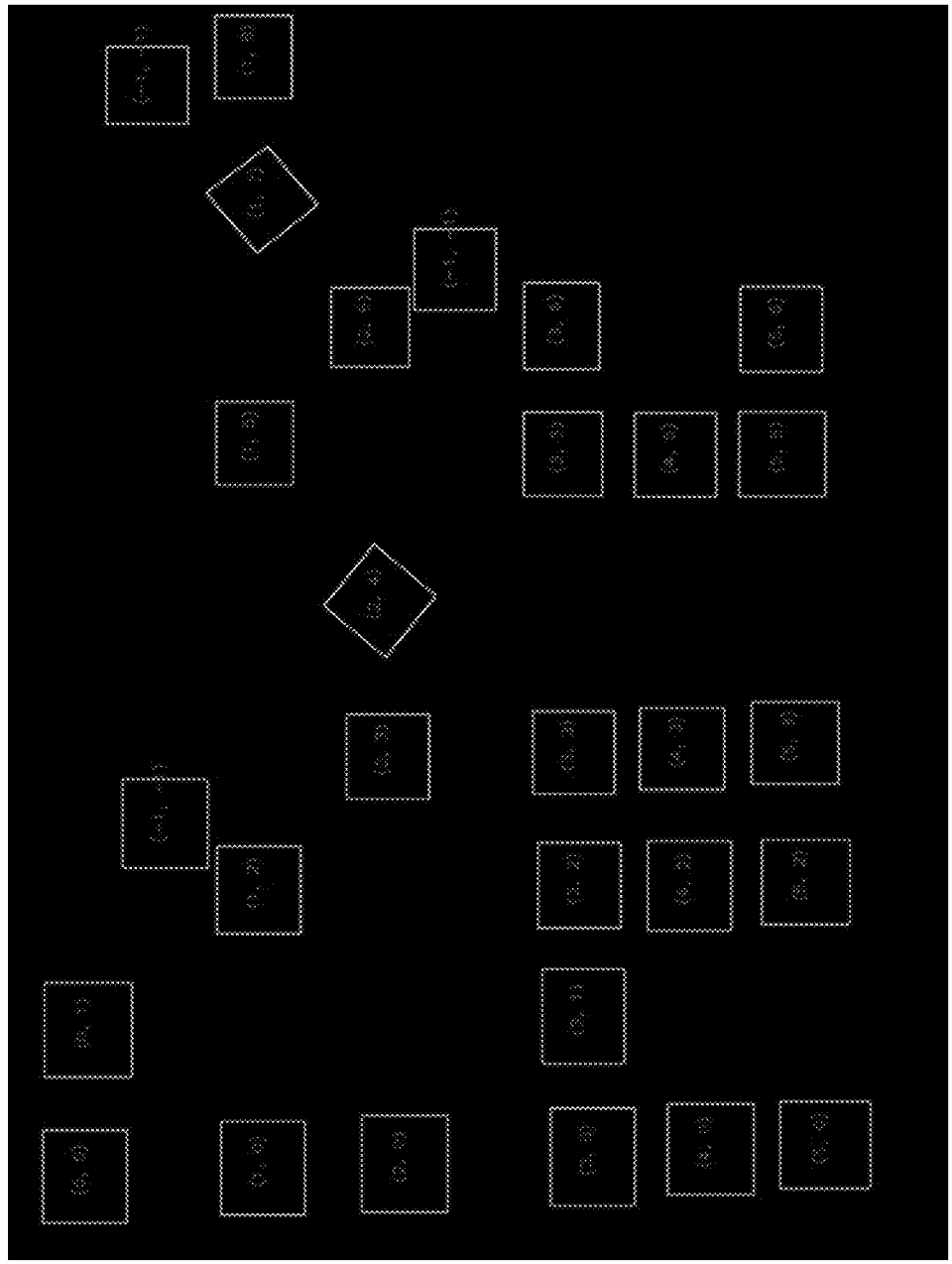
FIG. 17 is an example that may result from gridding in connection with certain example embodiments.

For gridding, some sticky notes (e.g., comments, problems, etc.) might be ignored (e.g., the row and column might be assigned the value −1 or other identifier). FIG. 17 is an example that may result from gridding in connection with certain example embodiments.

To identify the connections lines drawn between two sticky notes, a threshold may be applied to a grayscaled source image to transform it into a black and white image and reduce unwanted noise or objects (e.g., in the background). There are different types of thresholds that may affect the quality of the result. These include, for example, thresholding with a global value; clustering-based thresholding, where the threshold value is calculated for every cluster; combined clustering-based thresholding with spectrum analyzer output to eliminate additional noise; etc.

To further improve thresholding results, blurring filters may be applied before and/or after thresholding. Applying blur, erode, and/or other filters may also aid in closing otherwise open connection lines.

In addition, the information about sticky notes' positions and sizes, detected in the previous operations, can be used to isolate areas in the source images to detect the connection lines in. For example, it may be advantageous to remove sticky notes' areas before thresholding to reduce noise from the sticky notes itself, process only areas between two or more sticky notes instead of the entire image, etc.

Figure 18:
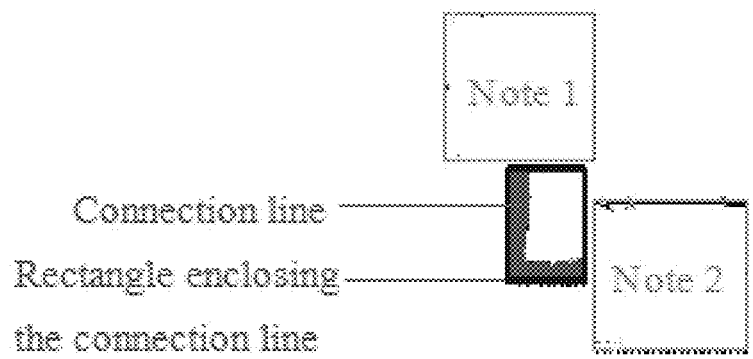
FIG. 18 is a diagram that helps explain a first approach for finding connection lines and determining the objects they connect, which may be used in connection with certain example embodiments.

Once objects to be considered connection lines are detected, the sticky notes that they are connecting may be determined. To identify the start and end of a connection line and the sticky notes it is connecting, different approaches may be used. A first approach for finding connection lines and determining the objects they connect that may be used in connection with certain example embodiments is described in connection with FIG. 18. In this approach, the contours that are considered sticky notes are extracted, and a check is made for near or intersecting sticky notes. By identifying two vertices for a suspected connection line, a rectangle enclosing it can be determined. Then, the distances of the vertices can be analyzed, and the nearest sticky notes can be found, e.g., factoring in this distance information. Based on this processing, a connection line may be identified.

In a second approach, image processing enables navigation in the image by detection of similarly colored pixels, provided that they are neighbors, followed by enclosure in a boundary. Each enclosure represents a connection line. There typically will be many enclosure. Inside each enclosure, navigating from the leftmost pixel to the rightmost pixel using an image processing algorithm by identifying the same color pixels helps identify line segments.

Figure 19:
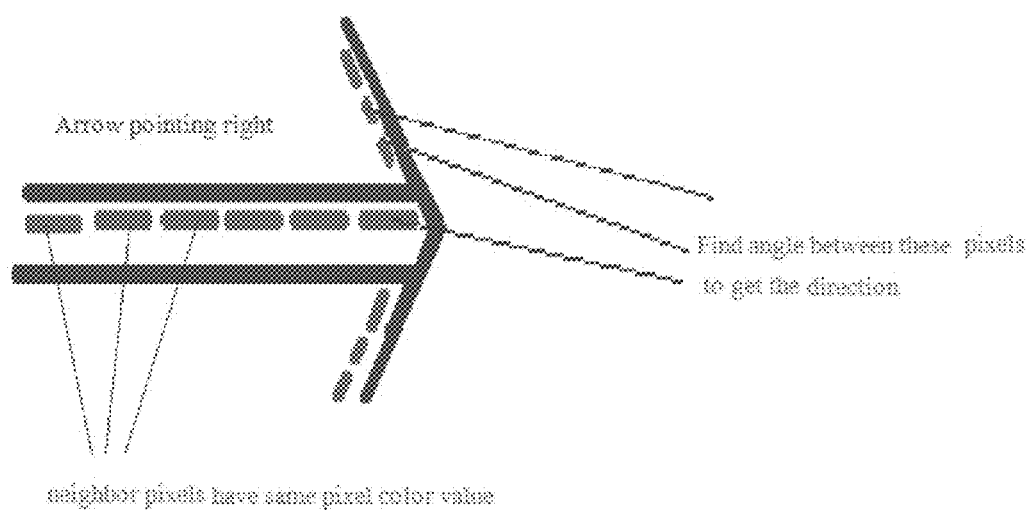
FIG. 19 is a diagram showing one approach to understanding the direction of a connection line, if any, which may be used in connection with certain example embodiments.

FIG. 19 is a diagram showing one approach to understanding the direction of a connection line, if any, which may be used in connection with certain example embodiments. As shown in FIG. 19, the direction of an arrow (if any) can be identified by navigation among pixels and calculating an end angle with respect to other pixels.

Figure 20:
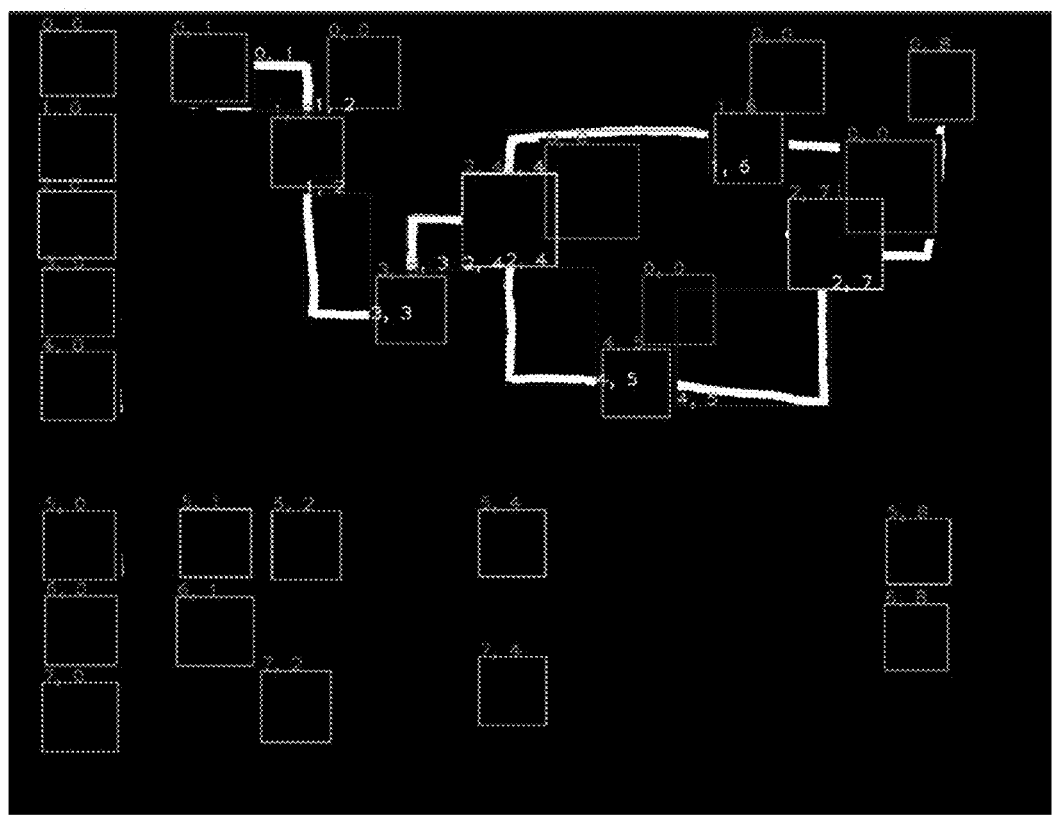
FIG. 20 is a diagram showing how an example whiteboard model having been image-processed to identify objects and connections and to perform gridding, in connection with certain example embodiments.

FIG. 20 is a diagram showing how an example whiteboard model having been image-processed to identify objects and connections and to perform gridding, in connection with certain example embodiments. Sticky notes are identified with orange, green, and pink rectangles; and connection lines are identified with white lines. The irrelevant areas may be discarded, and this image may form the basis of the overlay (e.g., as shown in and described in connection with FIG. 8).

To facilitate text recognition, each object may be considered in isolation. In other words, detected sticky notes may be cropped from the source image and processed individually and, to improve the performance and quality of the text recognition, the text components and its areas may be determined from within the cropped sticky note. This approach advantageously helps reduce noise that could potentially downgrade the quality of the text recognized in the character recognition itself.

Figure 21:
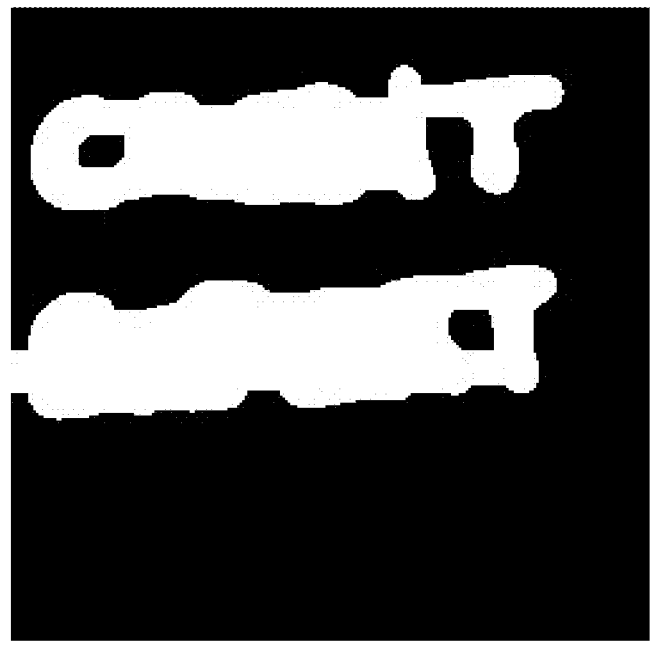
FIGS. 21-22 help demonstrate how text may be recognized in connection with certain example embodiments.
Figure 22:

The text areas may be cropped out of each sticky note and fed into an OCR engine such as, for example, the Tesseract open source framework. See FIG. 21 in this regard. By finding contours, it is possible to bind a rectangle around each of the words inside the sticky note. See FIG. 22 in this regard. These identified areas around the words may be cropped from the processed image and then fed into the text recognition engine, word-by-word, or area-by-area. The text recognition engines thus has an improved chance of accurately providing the word(s) enclosed in the areas.

Although certain example embodiments have been described in connection with drawings on a whiteboard, it will be appreciated that the techniques described herein may be used in connection with drawings in/on other mediums. For example, drawings may be provided on flipcharts, paper, walls, back-painted glass surfaces, etc., in different example embodiments. Similarly, drawings may be provided on real-world physical media and/or electronic media (e.g., sketched on a tablet, smart whiteboard, and/or the like), in different example embodiments.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for creating and/or updating a computerized model usable in connection with an enterprise modeling platform, the computerized model being defined in connection with a first modeling language, the system comprising:
   a display device; and
   processing resources including at least one processor and a memory operably coupled thereto, the processing resources being configured to control the system to at least:
   receive an image of a hand-drawn model, the hand-drawn model existing on a physical substrate and following rules associated with a second modeling language, the first and second modeling languages being different from one another;

perform image processing on the image of the hand-drawn model, the image processing including a plurality of different identification levels, the different identification levels respectively corresponding to recognitions of (a) structures in the image that correspond to objects in the hand-drawn model, (b) object types for the identified structures that correspond to the objects, (c) text associated with the identified structures that correspond to the objects, and (d) connections between at least some of the identified structures that correspond to the objects;

generate a digitized iteratively-reviewed version of the hand-drawn model by:

presenting, on the display device and on an identification level by identification level basis, results of the recognitions corresponding to the respective identification levels, and accepting user modification(s) to the results on the identification level by identification level basis; and transform the digitized iteratively-reviewed version of the hand-drawn model into the computerized model in accordance with a set of rules defining relationships between elements in the first and second modeling languages.

2. The system of claim 1, wherein the first modeling language is user-adaptable.

3. The system of claim 1, wherein the first modeling language is defined so as to specify semantics of model objects based on coloring and shape; semantics of a model as a function of shapes, colors, positioning, and interconnectedness of its model objects; and implicit information about model objects based on grid location.

4. The system of claim 3, wherein model objects located in a first column of a grid logically imposed on the physical substrate are defined as role type model objects, provided that such model objects are in a lane with one or more model objects corresponding to process steps.

5. The system of claim 4, wherein roles and process step type model objects are defined to be represented by different colors.

6. The system of claim 3, wherein model objects located in the first column of the grid logically imposed on the physical substrate are defined as additional semantic objects, provided that such model objects are below a lowest lane including a process step.

7. The system of claim 6, wherein model objects located in lanes with additional semantic objects are defined to specify features of model objects corresponding to process steps that are located in the same column.

8. The system of claim 6, wherein model objects located in lanes with additional semantic objects represent input, output, system, and/or timing related semantics.

9. The system of claim 1, wherein the transformation generates a structured file type understandable by, and communicated to, the enterprise modeling platform.

10. The system of claim 1, wherein the processing resources are configured to control the system to at least transmit to a repository of the enterprise modeling platform data representative of the transformed digitized iteratively-reviewed version of the hand-drawn model.

11. The system of claim 1, wherein the processing resources are configured to control the system to at least generate and display in separate layers representations of the recognized objects and the image of the hand-drawn model.

12. The system of claim 1, further comprising a camera configured to take a picture corresponding to the image of the hand-drawn model.

13. The system of claim 1, further comprising a mobile electronic device, the processing resources being incorporated into the mobile electronic device.

14. The system of claim 1, wherein the processing resources are configured to control the system to at least provide output related to the generation of the digitized iteratively-reviewed version of the hand-drawn model to a machine learning module to improve accuracy of the recognitions.

15. A method of creating and/or updating a computerized model usable in connection with an enterprise modeling platform, the computerized model being defined in connection with a first modeling language, the method comprising:

receiving an image of a hand-drawn model, the hand-drawn model existing on a physical substrate and following rules associated with a second modeling language, the first and second modeling languages being different from one another;

performing, using processing resources including at least one processor and a memory operably coupled thereto, image processing on the image of the hand-drawn model, the image processing including a plurality of different identification levels, the different identification levels respectively corresponding to recognitions of (a) structures in the image that correspond to objects in the hand-drawn model, (b) object types for the identified structures that correspond to the objects, (c) text associated with the identified structures that correspond to the objects, and (d) connections between at least some of the identified structures that correspond to the objects;

generating, using the processing resources, a digitized iteratively-reviewed version of the hand-drawn model by:

presenting, on a display device and on an identification level by identification level basis, results of the recognitions corresponding to the respective identification levels, and accepting user modification(s) to the results on the identification level by identification level basis; and transforming the digitized iteratively-reviewed version of the hand-drawn model into the computerized model in accordance with a set of rules defining relationships between elements in the first and second modeling languages.

16. The method of claim 15, wherein the first modeling language is defined so as to specify semantics of model objects based on coloring and shape; semantics of a model as a function of shapes, colors, positioning, and interconnectedness of its model objects; and implicit information about model objects based on grid location.

17. The method of claim 15, wherein:

model objects located in a first column of a grid logically imposed on the physical substrate are defined as role type model objects, provided that such model objects are in a lane with one or more model objects corresponding to process steps, and/or model objects located in the first column of the grid logically imposed on the physical substrate are defined as additional semantic objects, provided that such model objects are below a lowest lane including a process step.

18. The method of claim 17, wherein model objects located in lanes with additional semantic objects are defined to specify features of model objects corresponding to process steps that are located in the same column.

19. The method of claim 15, further comprising transmitting to a repository of the enterprise modeling platform data representative of the transformed digitized iteratively-reviewed version of the hand-drawn model.

20. The method of claim 15, further comprising generating and displaying in separate layers representations of the recognized objects and the image of the hand-drawn model.

21. The method of claim 15, wherein the processing resources are incorporated into a mobile electronic device that also includes a camera configured to take a picture corresponding to the image of the hand-drawn model.

22. A non-transitory computer readable storage medium tangibly storing a program for creating and/or updating a computerized model usable in connection with an enterprise modeling platform, the computerized model being defined in connection with a first modeling language, the program being executable by at least one processor of a computer to perform functionality comprising:
   receiving an image of a hand-drawn model, the hand-drawn model existing on a physical substrate and following rules associated with a second modeling language, the first and second modeling languages being different from one another;
   performing, using processing resources including at least one processor and a memory operably coupled thereto, image processing on the image of the hand-drawn model, the image processing including a plurality of different identification levels, the different identification levels respectively corresponding to recognitions of (a) structures in the image that correspond to objects in the hand-drawn model, (b) object types for the identified structures that correspond to the objects, (c) text associated with the identified structures that correspond to the objects, and (d) connections between at least some of the identified structures that correspond to the objects;
   generating, using the processing resources, a digitized iteratively-reviewed version of the hand-drawn model by:
      presenting, on a display device and on an identification level by identification level basis, results of the recognitions corresponding to the respective identification levels, and
      accepting user modification(s) to the results on the identification level by identification level basis; and
   transforming the digitized iteratively-reviewed version of the hand-drawn model into the computerized model in accordance with a set of rules defining relationships between elements in the first and second modeling languages.

23. The non-transitory computer readable storage medium of claim 22, wherein the first modeling language is defined so as to specify semantics of model objects based on coloring and shape; semantics of a model as a function of shapes, colors, positioning, and interconnectedness of its model objects; and implicit information about model objects based on grid location.

24. The non-transitory computer readable storage medium of claim 22, wherein:
   model objects located in a first column of a grid logically imposed on the physical substrate are defined as role type model objects, provided that such model objects are in a lane with one or more model objects corresponding to process steps,
   model objects located in the first column of the grid logically imposed on the physical substrate are defined as additional semantic objects, provided that such model objects are below a lowest lane including a process step, and
   model objects located in lanes with additional semantic objects are defined to specify features of model objects corresponding to process steps that are located in the same column.

25. The non-transitory computer readable storage medium of claim 22, wherein the functionality further comprises transmitting to a repository of the enterprise modeling platform data representative of the transformed digitized iteratively-reviewed version of the hand-drawn model.

26. The non-transitory computer readable storage medium of claim 22, wherein the functionality further comprises generating and displaying in separate layers representations of the recognized objects and the image of the hand-drawn model.

* * * * *